United States Patent
Kwon et al.

(10) Patent No.: US 10,185,676 B2
(45) Date of Patent: Jan. 22, 2019

(54) DIRECT MEMORY ACCESS CONTROLLER AND SYSTEM FOR ACCESSING CHANNEL BUFFER

(71) Applicant: SAMSUNG ELECTRONICS CO., LTD., Suwon-si (KR)

(72) Inventors: Ki-seok Kwon, Seoul (KR); Suk-jin Kim, Seoul (KR); Do-hyung Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 398 days.

(21) Appl. No.: 14/619,783

(22) Filed: Feb. 11, 2015

(65) Prior Publication Data

US 2015/0227479 A1    Aug. 13, 2015

(30) Foreign Application Priority Data

Feb. 12, 2014 (KR) .................. 10-2014-0016273

(51) Int. Cl.
  *G06F 13/28*  (2006.01)
(52) U.S. Cl.
  CPC .............. *G06F 13/28* (2013.01); *Y02D 10/14* (2018.01)
(58) Field of Classification Search
  CPC ............................ G06F 13/28; G06F 13/1673
  USPC ........................................................ 710/110
  See application file for complete search history.

(56) References Cited

U.S. PATENT DOCUMENTS

| | | | | |
|---|---|---|---|---|
| 4,441,162 A * | 4/1984 | Lillie | .................... | G06F 13/128 370/229 |
| 4,847,750 A * | 7/1989 | Daniel | .................... | G06F 13/28 710/22 |
| 5,001,624 A * | 3/1991 | Hoffman | ................. | G06F 13/28 710/100 |
| 5,835,733 A * | 11/1998 | Walsh | ..................... | G06F 13/28 361/679.32 |
| 5,875,312 A * | 2/1999 | Walsh | ..................... | G06F 13/28 710/303 |
| 6,701,405 B1 * | 3/2004 | Adusumilli | ............. | G06F 13/28 710/22 |
| 7,536,669 B1 * | 5/2009 | Anderson | ........... | G06F 17/5054 710/308 |
| 8,417,844 B2 | 4/2013 | Go et al. | | |
| 2009/0222598 A1 * | 9/2009 | Hayden | .................. | G06F 13/28 710/28 |
| 2012/0233360 A1 | 9/2012 | Go et al. | | |
| 2016/0299859 A1 * | 10/2016 | Popa | .................. | G06F 11/3648 |

* cited by examiner

*Primary Examiner* — Titus Wong
(74) *Attorney, Agent, or Firm* — Sughrue Mion, PLLC (57) ABSTRACT

A direct memory access (DMA) controller is provided. The DMA controller includes a processor interface configured to directly receive information representing a first operation sent by a processor to a buffer, and transmit data corresponding to the first operation stored in the buffer to the processor core or record data corresponding to the first operation in the buffer, and a buffer group connected to the processor interface, and including a plurality of buffers.

11 Claims, 8 Drawing Sheets

DIRECT MEMORY ACCESS CONTROLLER AND SYSTEM FOR ACCESSING CHANNEL BUFFER

CROSS-REFERENCE TO RELATED APPLICATION(S)

This application claims priority from Korean Patent Application No. 10-2014-0016273, filed on Feb. 12, 2014 in the Korean Intellectual Property Office, the disclosure of which is incorporated herein in its entirety by reference.

BACKGROUND

1. Field

Apparatuses and methods consistent with exemplary embodiments relate to a direct memory access controller and system capable of directly accessing a channel buffer.

2. Description of Related Art

A direct memory access (DMA) method is a data transmission method between an external memory and an input/output device which does not use a central processing unit (CPU). Because DMA does not use a CPU, a DMA controller is added in a system bus in order to perform the DMA method.

A DMA controller may perform some functions of a CPU instead of the CPU, in response to receiving a control signal for controlling a system from the CPU. The CPU may entrust the DMA controller with a data transmission operation, and the DMA controller may process the data transmission operation on behalf of the CPU. The DMA controller may directly transmit data to an external memory without using the CPU. When all of the data has been transmitted, the DMA controller generates an interrupt signal and transmits the interrupt signal to the CPU.

To more efficiently perform direct memory access, there is a need for reducing latency that occurs during the transfer of a data stream (hereinafter, referred to as 'data') and reducing power consumption when accessing an external memory in a system including a DMA controller.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments include a DMA controller and system capable of directly accessing a channel buffer.

According to an aspect of an exemplary embodiment, there is provided a DMA controller including a processor interface configured to directly receive information representing a first operation sent by a processor core to a buffer, and transmit data which corresponds to the first operation and is stored in the buffer to the processor core or record data which corresponds to the first operation in the buffer, and a buffer group connected to the processor interface, and comprising a plurality of buffers including the buffer.

The DMA controller may further include a channel group comprising a plurality of DMA channels, a slave interface configured to receive information representing a second operation sent by the processor core to the channel group, and allocate the second operation to at least one DMA channel from among the plurality of DMA channels included in the channel group, and a master interface group connected to the buffer group, and comprising at least one master interface configured to transmit and receive data corresponding to the second operation to and from an external memory.

The at least one DMA channel may operate in a mode from among a first mode in which data included in a first slave device is stored in the buffer and a second mode in which data stored in the buffer is transmitted to a second slave device, and the first slave device and the second slave device may be connected to the master interface group.

The information representing the first operation may include information for designating one of the DMA channels included in the channel group, and the processor interface may transmit data corresponding to the first operation from a buffer that is connected to the designated DMA channel to the processor core or record data corresponding to the first operation from the processing core in the buffer that is connected to the designated DMA channel.

The processor interface and the slave interface may be physically included in the same interface.

The DMA controller may further include an internal bus connected to the buffer group, the master interface group, and the processor interface.

The plurality of buffers may input and output data in a first-in-first-out (FIFO) manner.

The plurality of buffers included in the buffer group may input and output data in a random access manner.

The random access manner may include one of a first type in which the data is input and output to and from an entry included in the buffer based on a preset pattern, a second type in which the data is input and output to and from the entry based on an input stride, and a third type in which the data is input and output to and from the entry based on an order pattern defined in a pattern register.

At least two buffers from among the plurality of buffers may be connected to each other and may input and output the data as a double buffer.

At least one buffer of the at least two buffers connected to each other as the double buffer may input and output the data in a first-in-first-out (FIFO) manner, and remaining buffers from among the at least two buffers connected to each other as the double buffer may input and output the data in a random access manner.

According to an aspect of another exemplary embodiment, there is provided a system including a direct memory access (DMA) controller, and a processor core connected to the DMA controller, wherein the DMA controller includes a processor interface to directly receive information representing a first operation sent by a processor core to a buffer, and transmit data corresponding to the first operation stored in the buffer to the processor core or record data corresponding to the first operation in the buffer, and a buffer group connected to the processor interface, and comprising a plurality of buffers including the buffer.

The DMA controller further include a channel group comprising a plurality of DMA channels, a slave interface configured to receive information representing a second operation sent by the processor core to the channel group, and allocate the second operation to at least one channel from among the DMA channels included in the channel group, and a master interface group connected to the buffer group, and including one or more master interfaces configured to transmit and receive data corresponding to the second operation to and from an external memory.

The at least one DMA channel may operate in a mode from among a first mode in which data included in a first slave device is stored in the buffer and a second mode in which data stored in the buffer is transmitted to a second slave device, and the first slave device and the second slave device may be connected to the master interface group.

The processor interface and the slave interface may be physically included in the same interface.

The plurality of buffers may input and output data in a first-in-first-out (FIFO) manner or in a random access manner.

The random access manner may include one of a first type in which the data is input and output to and from an entry included in the buffer based on a preset pattern, a second type in which the data is input and output to and from the entry based on an input stride, and a third type in which the data is input and output to and from the entry based on an order pattern defined in a pattern register.

At least two buffers from among the plurality of buffers may be connected to each other and may input and output the data as a double buffer.

At least one buffer of the at least two buffers connected to each other may input and output the data in a first-in-first-out (FIFO) manner, and remaining buffers from among the at least two buffers connected to each other may input and output the data in a random access manner.

Based on a signal transmitted from a DMA channel, each of the plurality of buffers included in the buffer group may input and output the data in a first-in-first-out (FIFO) manner, or the plurality of buffers included in the buffer group may be connected to each other as a multi-buffer.

BRIEF DESCRIPTION OF THE DRAWINGS

The above and/or other aspects will become more apparent from the following description of the exemplary embodiments, taken in conjunction with the accompanying drawings in which.

DETAILED DESCRIPTION

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description.

As used herein, the term "and/or" includes any and all combinations of one or more of the associated listed items. Expressions such as "at least one of," when preceding a list of elements, modify the entire list of elements and do not modify the individual elements of the list.

Figure 1:
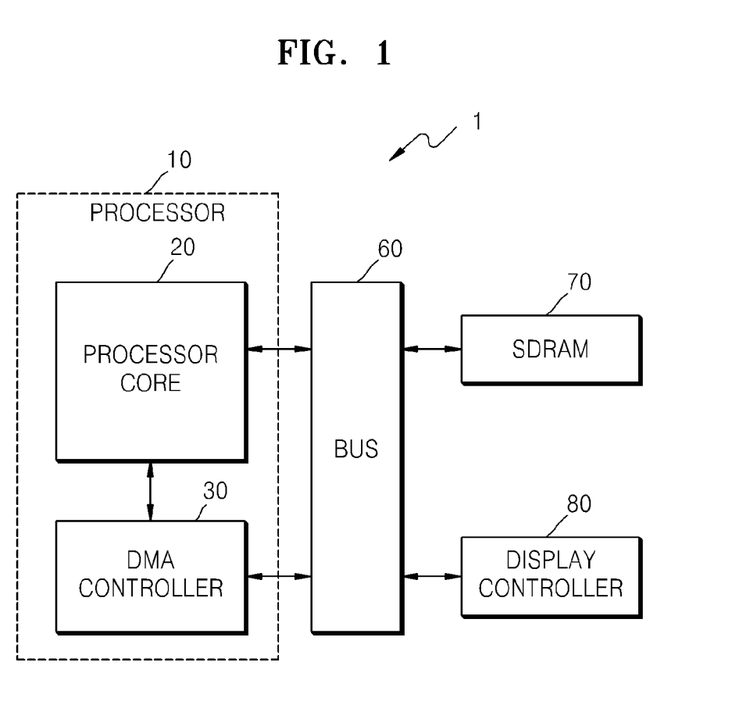
FIG. 1 is a block diagram of a digital system according to an exemplary embodiment.

FIG. 1 is a block diagram of a digital system 1 according to an exemplary embodiment.

Referring to FIG. 1, the digital system 1 includes a processor 10, a bus 60, an external memory 70, and a display controller 80. In this example, the processor 10 includes a processor core 20 and a direct memory access (DMA) controller 30. While the digital system 1 shown in FIG. 1 only includes components that are related to the present embodiment, one of ordinary skill in the art would appreciate that additional elements not shown in FIG. 1 may be further included in the digital system 1.

The processor 10 performs predetermined operations. For example, the predetermined operations may include an operation performed based on a signal transmitted from outside of the digital system 1, intermediate operations performed while the operation is being performed based on the signal transmitted from the outside, and the like. The processor 10 includes the DMA controller 30, and the processor core 20 is connected to the DMA controller 30.

Although not shown in FIG. 1, the processor 10 may further include a scratch pad memory, a cache, and the like. The scratch pad memory or the cache may be any kind of device that may be included in the processor 10 separate from an external memory 70 and may be used to temporarily store data.

In this example, the bus 60 connects the processor 10 and an external device (for example, the external memory 70 or the display controller 80) to each other to transmit data and other signals therebetween. Referring to FIG. 1, the digital system 1 additionally includes the bus 60 connecting the processor 10 to the external device. As another example, the processor 10 and the external device may be directly connected to each other without using the bus 60.

The external memory 70 is illustrated as a synchronous dynamic random-access memory (SDRAM). However, the external memory 70 is not limited to a certain storage device such as a static random access memory (SRAM) or a dynamic RAM (DRAM), and may be any kind of storage device. Also, the display controller 80 controls a display device that may be built in a device including the digital system 1.

An example of a flow of transferring and processing data in the digital system 1 of FIG. 1 is as follows. First, the DMA controller 30 transfers data from the external memory 70 to a buffer included in the DMA controller 30, thereby storing the data in the buffer. The data may be related to an operation executed by the processor core 20, and the external memory 70 is a storage device in which the data is stored. The DMA controller 30 may transmit the data stored in the buffer to a register file included in the processor core 20, thereby recording the data in the register file.

The processor core 20 may perform an operation using the data recorded in the register file, and record another result of the operation in the register file. The processor core 20 may transmit the data recorded in the register file to the buffer included in the DMA controller 30, for example, using a memory write command, thereby storing the data in the buffer. In addition, the DMA controller 30 may transfer the data stored in the buffer to the external memory 70.

If the processor 10 further includes a scratch pad memory or a cache, the data transmission between the processor core 20 and the DMA controller 30 may be performed via the scratch pad memory or the cache.

In addition, an example of transferring data in the DMA controller 30 is described below with reference to FIG. 2 which is a diagram illustrating elements included in the DMA controller 30 according to an exemplary embodiment.

Figure 2:
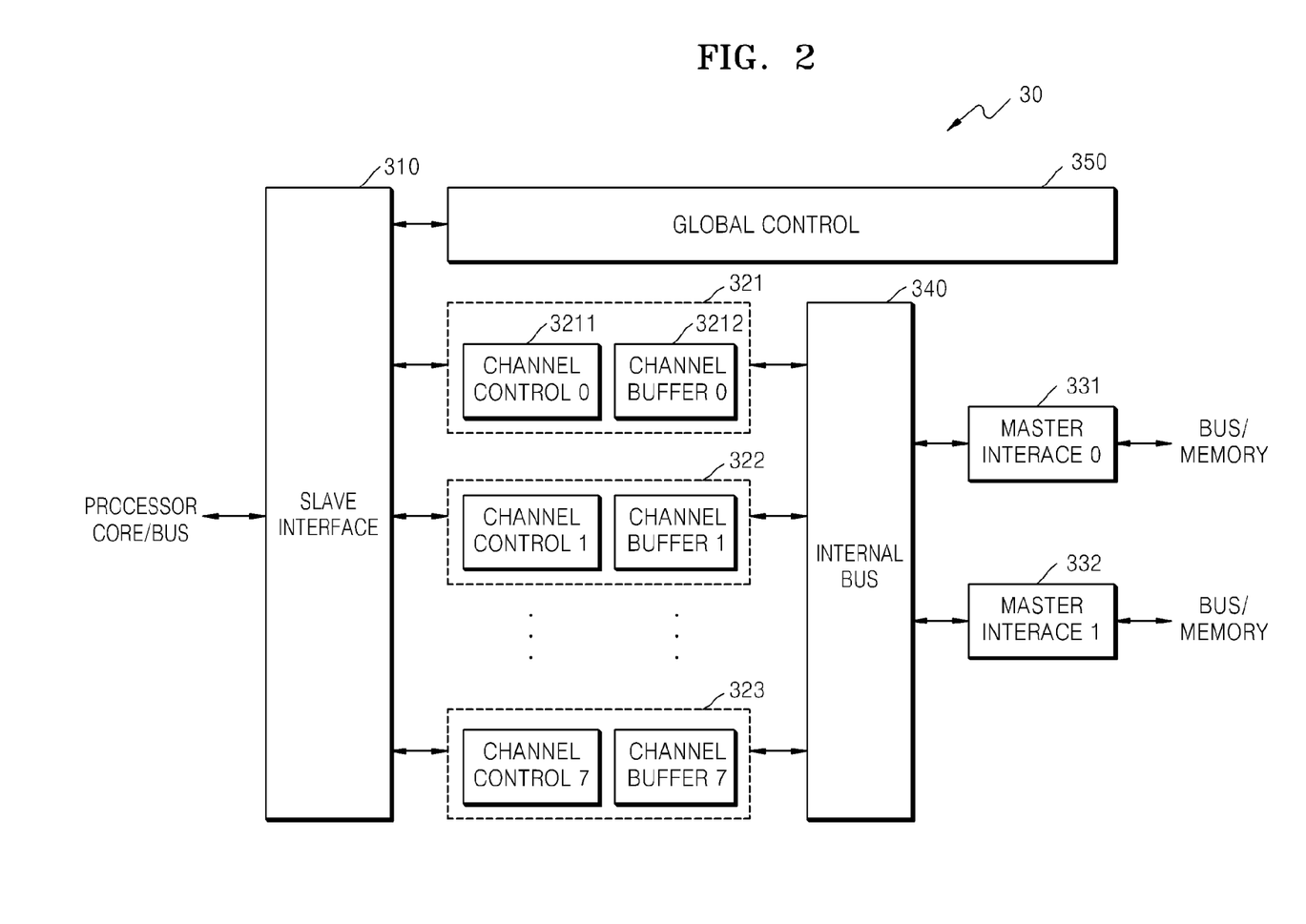
FIG. 2 is a block diagram of a DMA controller according to an exemplary embodiment.

Referring to FIG. 2, the DMA controller 30 includes a slave interface 310, a plurality of channels 321 through 323, a plurality of master interfaces 331 and 332, an internal bus 340, and a global controller 350. Each channel such as channel 321 includes a channel controller 3211 and a channel buffer 3212.

The channel controller 3211 stores transfer information transmitted from the slave interface 310 and controls the channel 321. The transfer information may include information about data corresponding to an operation executed by the processor core 20. For example, the transfer information may include a source memory address, a destination memory address, a basic unit of data (for example, 32 bits or 64 bits), a total number of pieces of data, a priority order among channels, bus settings, and the like. The channel buffer 3212 may store data that will be transferred by the processor core 20 to the external memory 70 or data that will be transferred by the external memory 70 to the processor core 20.

A transfer setting of channel 321 is performed by the processor core 20 that records values in registers included in the channel controller 3211 via the slave interface 310.

In this example, the channels 321 through 323 included in the DMA controller 30 share the master interfaces 331 and 332 via the internal bus 340. The master interfaces 331 and 332 are connected to the external bus 60 shown in FIG. 1, and may transfer data from the channel buffer 3212 to the external memory 70 or from the external memory 70 to the channel buffer 3212 via the bus 60. Two master interfaces 331 and 332 included in the DMA controller 30 are shown in FIG. 2, however, the embodiments described herein are not limited thereto.

The global controller 350 controls the overall operations of the DMA controller 30. For example, the global controller 350 may simultaneously turn on and turn off the channels 321 through 323 included in the DMA controller 30. An example of transmitting and receiving data using the DMA controller 30 of FIG. 2 is described with reference to FIG. 3.

Figure 3:
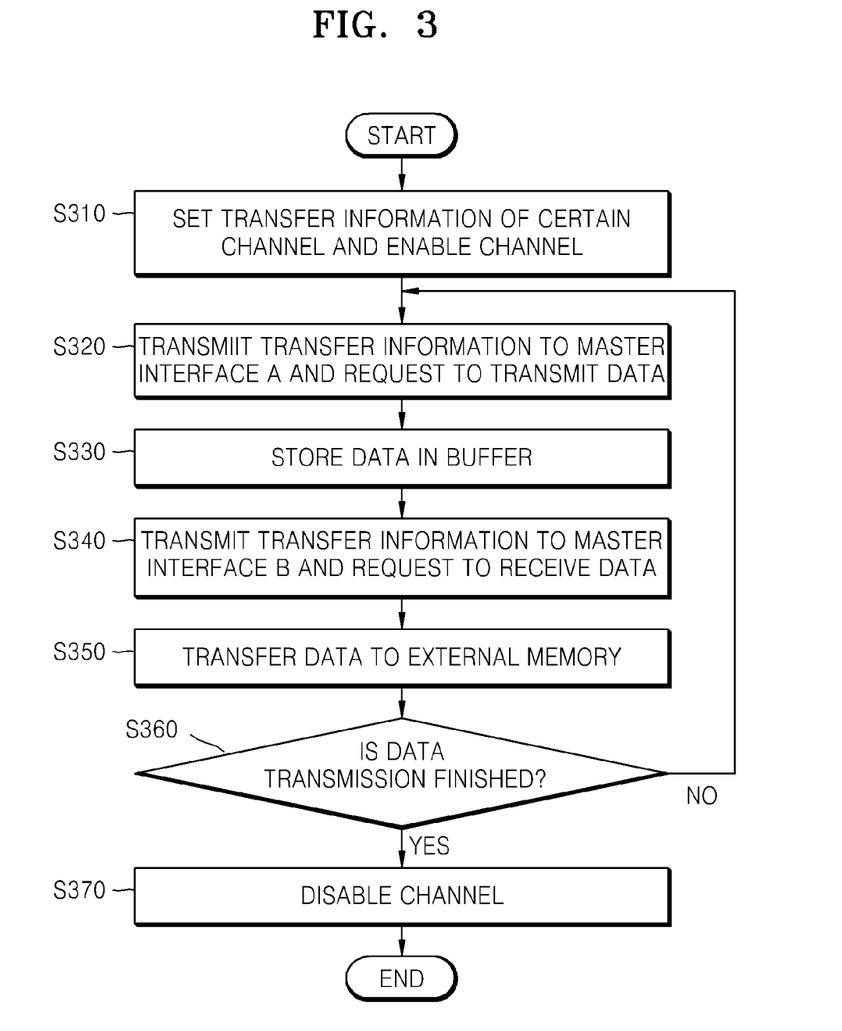
FIG. 3 is a flowchart of a method of transmitting and receiving data using the DMA controller according to an exemplary embodiment.

FIG. 3 is a flowchart of a method of transmitting and receiving data using the DMA controller 30 according to an exemplary embodiment.

Referring to FIG. 3, the method includes processes that are performed in the DMA controller 30 of FIG. 2 in a time-serial manner. Therefore, descriptions about the digital system 1 or the DMA controller 30 shown in FIGS. 1 and 2 are applicable to the method of transmitting and receiving data of FIG. 3. In this example, data is transmitted through the first channel 321, from among the plurality of channels 321 through 323 included in the DMA controller 30.

In S310, the processor core 20 transmits transfer information to the first channel 321 via the slave interface 310 and enables the first channel 321. For example, the transfer information may include the source memory address, the destination memory address, a basic unit of data, a total number of pieces of data, a priority order among channels, bus settings, and the like.

In S320, the first channel 321 transmits the transfer information to a master interface A 331 that is connected to an external memory as designated by the source memory address in the external memory 70, and requests the master interface A 331 to transmit data corresponding to the transfer information.

In S330, in response, the master interface A 331 reads data from the external memory designated by the source memory address, and stores the data in the channel buffer 3212.

In S340, the first channel 321 transmits the transfer information to the master interface B 332 connected to an external memory as designated by the destination memory address in the external memory 70, and requests to receive data corresponding to the transfer information from the master interface B 332.

In S350, in response, the master interface B 332 transmits data which corresponds to the transfer information and which is stored in the channel buffer 3212 to the external memory designated by the destination memory address.

In S360, the first channel 321 determines whether the data transmission is complete. If the data transmission is not finished, the process proceeds to S320, and if the data transmission is finished, the process proceeds to S370 in which the first channel 321 is disabled.

In the example of FIG. 3, the master interface A 331 and the master interface B 332 are different from each other. However, it should be appreciated that the master interface A 331 and the master interface B 332 may be the same master interface according to the source memory address and the destination memory address that is included in the transfer information.

In response to all data stored in the channel buffer 3212 being transferred to the external memory designated by the destination memory address, the first channel 321 may be disabled.

Referring back to FIG. 2, when the above operations are performed with reference to FIGS. 1 and 2, the data passes through a plurality of buffers and/or a plurality of register files. Accordingly, a latency occurs when the data stored in the external memory 70 is transmitted to the register file included in the processor core 20 and a latency occurs when the data recorded in the register file is transmitted to the external memory 70. As a result, power consumption to transmit the data also increases.

On the other hand, the processor core 20 according to various exemplary embodiments may directly access the buffer included in the DMA controller 30 and reduce the latency taken for the processor core 20 and the external memory 70 to transmit and receive the data and reduce the power consumption used to transmit the data.

For example, an interface of a processing core may be included within the DMA and may directly access the plurality of channel buffers to transmit data between the respective processing core and the plurality of channel buffers. The interface of the processing core may access the plurality of channel buffers directly without the use of a scratch-pad memory and without the use of a cache memory.

Examples of the DMA controller 30 according to various embodiments are described with reference to FIGS. 4 and 5.

Figure 4:
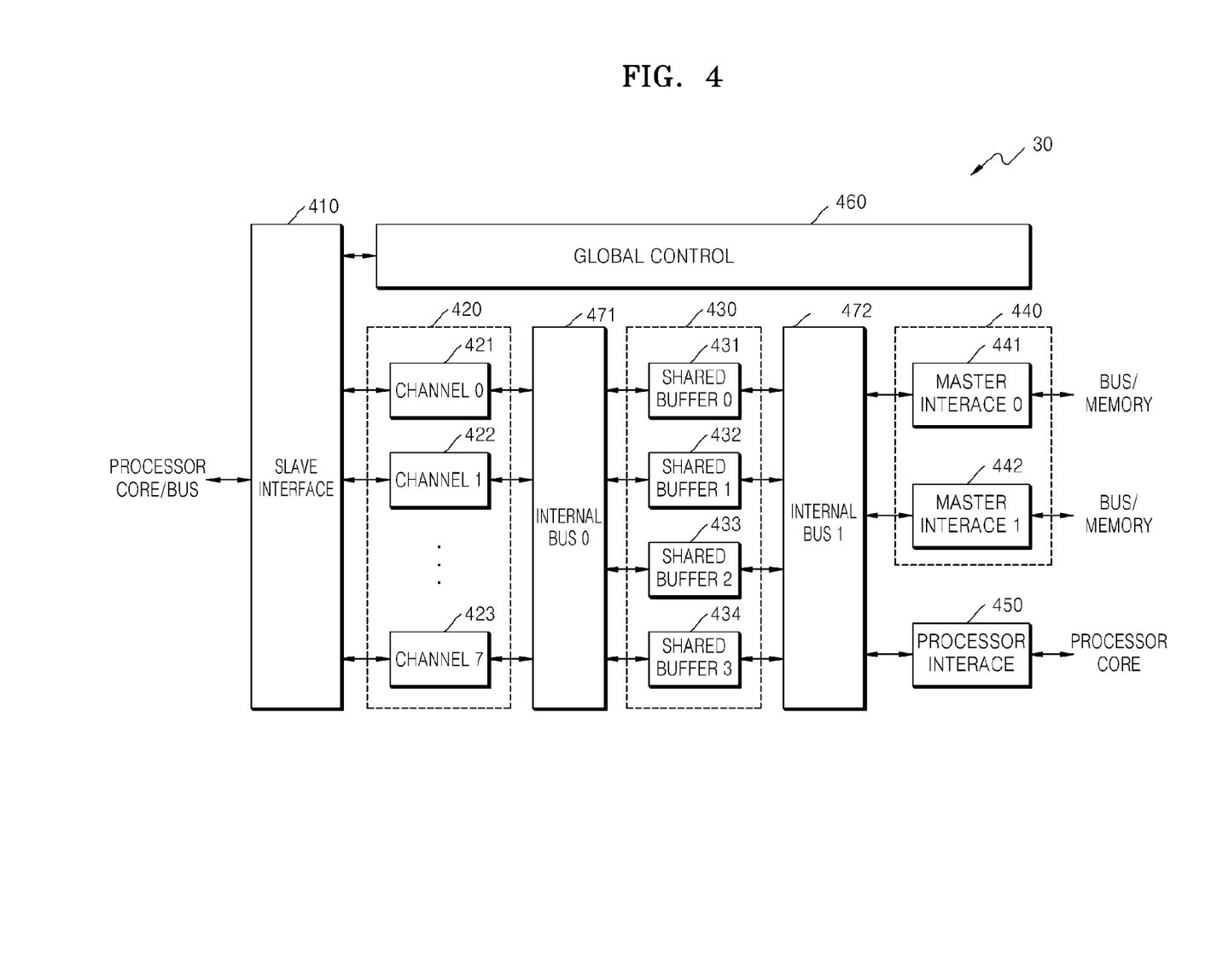
FIG. 4 is a block diagram of a DMA controller according to another exemplary embodiment.

FIG. 4 is a block diagram of an example of the DMA controller 30 according to an exemplary embodiment.

Referring to FIG. 4, the DMA controller 30 includes a slave interface 410, a channel group 420, a buffer group 430, a master interface group 440, a processor interface 450, a global controller 460, a first internal bus 471, and a second internal bus 472.

In FIG. 4, although only elements of the DMA controller 30 related to the present embodiment are shown, it should be appreciated that other universal elements may be further included in the DMA controller 30 in addition to the elements shown in FIG. 4.

The slave interface 410 receives information about a first operation requested by the processor core 20, and allocates the first operation to one or more channels 421 through 423 included in the channel group 420. For example, the first operation may be an operation requesting to receive data stored in the external memory 70 or an operation requesting to transmit data to the external memory 70.

That is, the processor core 20 may transmit a request to the slave interface 410 to transfer data for an operation that will be performed by the processor core 20 from the external memory 70, or a request for the slave interface 410 to record data generated as a result of an operation being performed by the processor core 20 in the external memory 70. The slave interface 410 transmits the request of the processor core 20 to one or more channels 421 through 423 included in the channel group 420, based on the request from the processor core 20. The slave interface 410 shown in FIG. 4 may perform the same function as the slave interface 310 shown in FIG. 2.

The channel group 420 includes a plurality of DMA channels. That is, the channel group 420 includes a plurality of DMA channels 421 through 423. The DMA channels 421 through 423 included in the channel group 420 of FIG. 4 perform the same functions as those of the channel controllers 3211 shown in FIG. 2. Also, the channel group 420 includes eight channels 421 through 423, however, the exemplary embodiments described herein are not limited thereto.

The buffer group 430 is connected to the master interface group 440 and the processor interface 450, and includes a plurality of buffers 431 through 434 for storing data. Each of the buffers 431 through 434 includes a plurality of entries that may store the data. The buffers 431 through 434 included in the buffer group 430 of FIG. 4 perform the same functions as those of the channel buffers 3212 shown in FIG. 2. Also, in FIG. 4, the buffer group 430 includes four buffers 431 through 434, however, the exemplary embodiments described herein are not limited thereto.

According to various aspects, the buffer group 430 may be isolated from the channel group 420. That is, in the DMA controller 30 shown in FIG. 2, each channel buffer is mapped to one channel. In contrast, the channels 421 through 423 included in the channel group 420 share the buffers 431 through 434 in the DMA controller 30 of FIG. 4. In this example, the DMA controller 30 includes a first internal bus 471 which enables the DMA channels 421 through 423 included in the channel group 420 to share the buffers 431 through 434, and a second internal bus 472 which enables the buffers 431 through 434 to share master interfaces 441 and 442.

Because the channels 431 through 423 included in the DMA controller 30 share the buffers 431 through 434, the channels 421 through 423 may effectively use the buffers 431 through 434 after the buffers 431 through 434 are distributed according to the number of enabled channels. Also, some of the buffers 431 through 434 may be connected to each other to form a data storage structure such as a double buffer or a triple buffer.

Three examples of operating the buffers 431 through 434 included in the buffer group 430 are further described below. In the examples below, the buffer 431 operates in an example in which a single buffer operates, and an example in which two buffers 431 and 432 form a double buffer. As another example, at least two or more buffers may individually input/output data in a first-in-first-out (FIFO) manner as single buffers.

In an example in which the buffer 431 operates in a FIFO manner, processes of transferring data from the external memory 70 to the processor core 20 may be performed as follows. The master interface 441 may sequentially record data in the entries of the buffer 431, and the processor interface 450 may sequentially transmit the data recorded in the entries.

If a sufficient amount of empty entries is not available in the buffer 431 for recording the data during the above processes, the master interface 441 does not request the external memory 70 to transfer the data, and rather waits until a sufficient amount of empty entries are available. If data is not fully recorded in the buffer 431 during the above processes, the processor interface 450 transmits a signal indicating that data is not recorded or is not finished recording in the buffer 431 to the processor core 20. In response, the processor core 20 may wait until the data is recorded in the entries of the buffer 431.

In an example in which the buffer 431 operates in the FIFO manner, processes of transferring data from the processor core 20 to the external memory 70 may be performed as follows. The processor interface 450 sequentially records data in the entries of the buffer 431, and the data recorded in the entries is sequentially transmitted to the master interface 441.

If a sufficient amount of empty entries in the buffer 431 is not available for recording the data during the above processes, the processor interface 450 may transmit a signal indicating that a sufficient amount of entries is not available in the buffer 431 to the processor core 20. In response, the processor core 20 may wait until a sufficient amount of empty entries become available. During the above process, the master interface 441 does not request the external memory 70 to receive the data and may wait until a sufficient amount of data is recorded in the entries of the buffer 431.

As another example, the buffer 431 may input/output data in a random access manner. For example, the random access type may include a first method that inputs/outputs data from the entries included in the buffer 431 based on a pattern that may be set in advance, a second method that inputs/outputs data from the entries based on an input stride, and a third method that inputs/outputs data from the entries based on an order pattern defined in a pattern register.

In an example in which the buffer 431 operates in the random access manner, the buffer 431 may receive an input which designates an address of an entry that is to be accessed from a memory such as a register file or an SRAM. The DMA controller 30 may continuously generate addresses of entries, for example, according to a predetermined rule that is based on a design type of the DMA controller 30.

The DMA controller 30 may provide a buffer entry address generation pattern, and the processor core 20 may select one from among a plurality of buffer entry address generation patterns when setting a channel via the slave interface 410. For example, the buffer entry address generation pattern may be generated according to different manners. Hereinafter, an example of the three manners is described under an assumption that the buffer 431 includes eight entries and natural numbers from 0 to 7 are allocated to the entries in an ascending order.

The first manner is a method of inputting/outputting data from the entries included in the buffer 431 based on a preset pattern. For example, the preset pattern may include a sequential pattern such as '0→1→2→3→4→5→6→7→0→ . . . ', a bit reverse pattern such as '0→4→2→6→1→5→3→7→0→ . . . ', a pattern such as '0→2→4→6→1→3→5→7→0→ . . . ', and the like.

The second manner is a method of inputting/outputting data from the entries included in the buffer 431 based on an input stride. For example, a programmer or user may set K as a stride, and the data may be input/output to/from the entries in an order of '0→K % N→(K*2) % N→(K*3) % N→(K*4) % N→ . . . '. Here, N denotes the number of entries in the buffer (for example, 8), and % denotes a calculation of obtaining a remainder of a division.

The third manner is a method of inputting/outputting data to/from the entries included in the buffer 431 based on an order pattern that is defined in a pattern register. For example, a programmer or user may set an order pattern as '0x75316420' in the pattern register, and the data may be input/output to/from the entries in an order of '7→5→3→1→6→4→2→0→7→ . . . '.

As another example, two or more buffers from among the buffers 431 through 434 may be connected to each other to input/output data as a double buffer. For example, two buffers 431 and 432 may be connected to each other as a double buffer to input/output data.

Each of two buffers 431 and 432 included in the double buffer may input/output data in a different manner or in a same manner. For example, the first buffer 431 may input/output data in the FIFO manner and the second buffer 432 may input/output data in the random access manner. As another non-limiting example, the double buffer may operate in the FIFO manner as a double buffer that includes the first buffer 431 and the second buffer 432 as entries.

In an example in which the buffers 431 and 432 operate as a double buffer, processes of transferring data from the external memory 70 to the processor core 20 may be performed as follows. An empty buffer from among the first buffer 431 and the second buffer 432 may be allocated to the master interface 441, and the master interface 441 may record data in the allocated buffer. For example, the allocated buffer may input/output data in the FIFO manner, the random access manner, or the like. After the data is recorded in all of the entries in the allocated buffer (for example, the first buffer 431), the master interface 441 may return the allocated buffer (for example, the first buffer 431) in which the data is recorded, and another buffer (for example, the second buffer 432) may then be allocated to the master interface 441. If no empty buffer is available during the above process, the master interface 441 may not request that the external memory 70 transfer the data, but may wait until an empty buffer becomes available.

The buffer having entries in which the data is recorded may be allocated to the processor interface 450, and the processor interface 450 may output the data recorded in the entries of the allocated buffer. For example, the allocated buffer may input or output data in the FIFO manner, the random access manner, and the like. When the data recorded in the entries of the allocated buffer (for example, the first buffer 431) is output, the processor interface 450 may return the buffer (for example, the first buffer 431) in which the data is recorded, and another buffer (for example, the second buffer 432) may then be allocated to the processor interface 450. If the no data is recorded in the buffers 431 and 432 during the above processes, the processor interface 450 may transmit a signal to the processor core 20 indicating that no data has been recorded to the buffers 431 and 432, and the processor core 20 may wait until the data is recorded in the buffers 431 and 432.

In an example in which the buffers 431 and 432 operate as a double buffer, the processes of transferring data from the external memory 70 to the processor core 20 are similar to the above processes.

As described herein, the buffers 431 through 434 included in the buffer group 430 may input or output data in the FIFO manner, the random access manner, as a double buffer, and the like. In these examples, each of the buffers 431 through 434 may input/output data in the FIFO manner based on the signal transmitted from the channels, or as one of the double buffer. That is, the data input/output method of each of the buffers 431 through 434 is not fixed, but may vary based on a signal that is transmitted from the channels.

The master interface group 440 includes one or more master interfaces 441 and 442 that transmits/receives data corresponding to the first operation to/from the external memory 70 based on the first operation. For example, the first operation may be the operation requesting to receive data stored in the external memory 70 or requesting transmission of data to the external memory 70. The master interfaces 441 and 442 included in the master interface group 440 of FIG. 4 perform the same functions as those of the master interfaces 331 and 332 shown in FIG. 2. Also, the master interface group 440 includes two master interfaces 441 and 442, however, the exemplary embodiments described herein are not limited thereto.

The global controller 460 may control the DMA controller 30. The global controller 460 of FIG. 4 performs the same function as that of the global controller 350 shown in FIG. 2.

The processor interface 450 may receive information representing a second operation requested by the processor core 20 to the buffers 431 and 432, and transmit the data stored in the buffers 431 through 434 to the processor core 20 or record the data in the buffers 431 through 434 based on the second operation. For example, the second operation may be an operation of requesting for the transmission of data stored in the buffers 431 through 434 or an operation of requesting to record data in the buffers 431 through 434.

The processor core 20 transfer a request to the processor interface 450 to read the data for the operation performed in the processor core 20 from the buffers 431 through 434, or to record data generated as a result of the operation performed in the processor core 20 in the buffers 431 through 434. The processor interface 450 may transmit the request from the processor core 20 to at least one of buffers from among the buffers 431 through 434 included in the buffer group 430, based on the request transferred from the processor core 20.

In this example, the DMA controller 30 includes a slave interface connected to the processor core 20. The slave interface 410 connected to the channels 421 through 423 functions as a general slave interface included in the DMA controller 30. However, the processor interface 450 according to various aspects is directly connected to the buffers 431 through 434 to receive a request to access the buffers 431 through 434 from the processor core 20.

Because the DMA controller 30 includes the processor interface 450 that directly connects the processor core 20 to the buffers 431 through 434, the data transmission process between the buffers 431 through 434 included in the DMA controller 30 and a scratch pad memory (not shown) may be omitted. Accordingly, latency for transmitting data between the processor 10 and the external memory 70 and the power consumption may be reduced.

The DMA controller 30 may provide a plurality of transmission modes. For example, each of the channels 421 through 423 included in the DMA controller 30 may perform at least one of three example transmission modes. In the first mode, data included in a first slave device (not shown) is stored in the buffer and then transmitted to a second slave device (not shown). The second mode and the third mode respectively may represent half of the data flow included in the first mode. For example, in the second mode, the data included in the first slave device may be stored in the buffer, and in the third mode, the data stored in the buffer may be transmitted to the second slave device. In addition, the first and second slave devices are external devices respectively connected to the first and second master interfaces 441 and 442.

Hereinafter, examples of the first through third modes are described under an assumption that the first channel 421 among the channels 421 through 423 is enabled.

The first mode includes a transmission mode performed by a general DMA controller 30. For example, the first channel 421 may read the data from the first slave device connected to the first master interface 441 and store the data in the buffer group 430. Then, during the transmission, the first channel 421 may transmit the data stored in the buffer group 430 to the second slave device connected to the second master interface 442. In this example, the first master interface 441 and the second master interface 442 may be the same interface. That is, the first master interface 441 and the second master interface 442 may be one master interface according to data.

The second mode is a transmission mode performed by the DMA controller 30 according to the embodiment. For example, the first channel 421 may read data from the first slave device connected to the first master interface 441 and store the data in the buffer group 430.

The third mode is a transmission mode performed by the DMA controller 30 according to the embodiment. For example, the first channel 421 may transmit the data stored in the buffer group 430 to the second slave device connected to the second master interface 442.

The second mode and the third mode respectively may represent half of the data flow included in the first mode. Each of the channels 421 through 423 may operate in one of the first through third modes based on settings included in the transfer information. For example, processes of transmitting data during a state in which the DMA controller 30 is set in the second mode are described with reference to FIG. 5.

Figure 5:
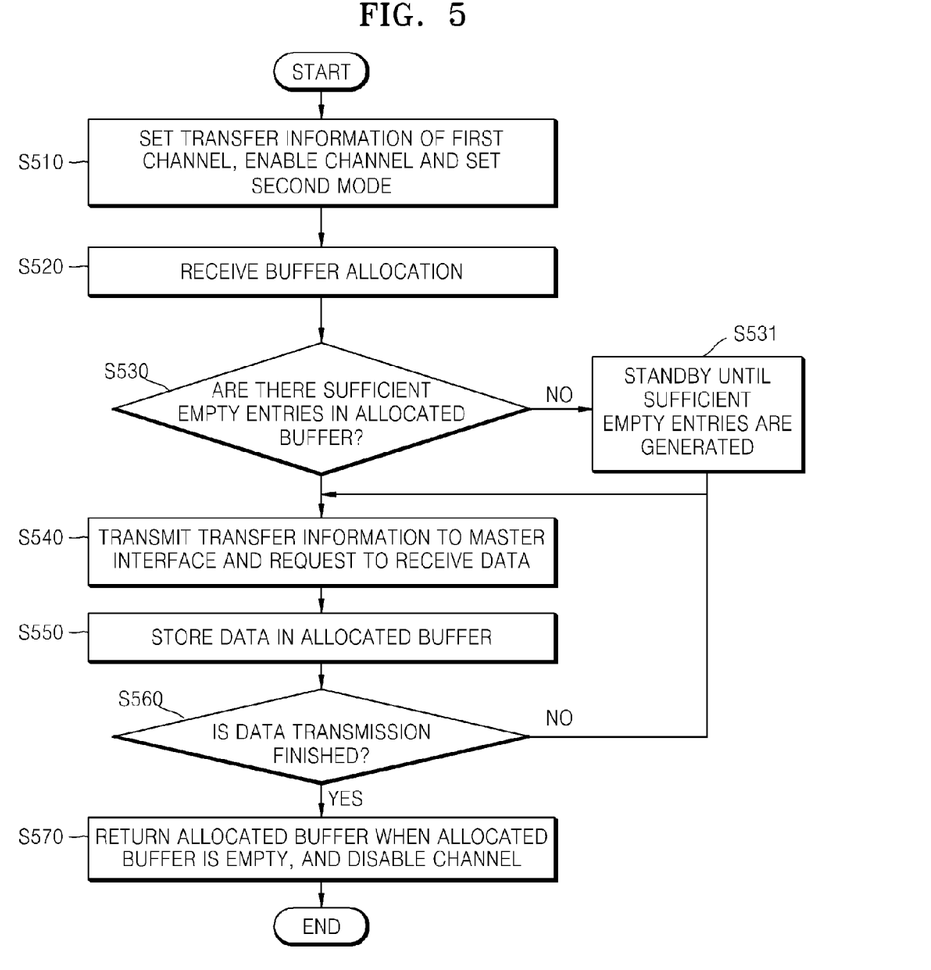
FIG. 5 is a flowchart of a method of transmitting and receiving data using a DMA controller according to another exemplary embodiment.

FIG. 5 is a flowchart illustrating a data transmission method in which the DMA controller 30 is set in a second mode to transmit data according to an exemplary embodiment.

Referring to FIG. 5, the method includes processes performed by the DMA controller 30 in a time-serial manner. It should be appreciated that the descriptions about the digital system 1 or the DMA controller 30 shown in FIGS. 1 and 4 may be applied to the data transmission method illustrated in FIG. 5. In this example, data is transmitted through the first channel 421 from among the channels 421 through 423 included in the DMA controller 30.

In S510, the processor core 20 transmits the transfer information to the first channel 421 via the slave interface 410 and enables the first channel 421. In this example, the processor core 20 sets the transmission mode of the first channel 421 as the second mode. The transfer information may include the source memory address, the destination memory address, basic terminal of the data, the total number of data pieces, a priority order among the channels, the bus settings, and the like.

In S520, at least one of the buffers 431 through 434 is allocated to the first channel 421. In S530, the first channel 421 determines whether there is a sufficient amount of empty or available entries in the allocated buffer. If there is a sufficient amount of empty entries, the process proceeds to S540, and if not, the process proceeds to S531. In S531, the first channel 421 waits until there is a sufficient amount of empty entries become available in the allocated buffer.

In S540, the first channel 421 transmits the transfer information to the master interface 441 that is connected to an external memory designated by the source memory address, and requests the external memory to transmit the data corresponding to the transfer information.

In S550, the master interface 441 reads the data from the external memory designated by the source memory address, and stores the data in the allocated buffer.

In S560, the first channel 421 determines whether the data transmission process is finished. If the data transmission is not finished, the process returns to S540, and if the data transmission is finished, the process proceeds to S570.

In S570, if the allocated buffer is completely empty, the first channel 421 returns the allocated buffer and is disabled, and if not, the first channel 421 waits until the allocated buffer is empty. According to various aspects, the processor core 20 may read the data frequency from the allocated buffer via the processor interface 450.

Referring back to FIG. 4, the DMA controller 30 includes the processor interface 450 which may transmit/receive data according to one of a plurality of modes for example the first through third modes. Therefore, when comparing with the data transmission flow of a general digital system, the data transmission flow of the digital system 1 illustrated with reference to FIG. 1 according to various embodiments has less transmission processes than a general digital system.

As an example, data transmission and processing flow in the digital system 1 according to various embodiments may be performed as follows. First, the DMA controller 30 may transmit data from the external memory 70 to the buffer included in the DMA controller 30. Here, the data is related to an operation performed by the processor core 20, and the external memory 70 is a storage device storing data corresponding to the operation.

After that, the processor core 20 transfers the data from the buffer to the register file included in the processor core 20, for example, using a memory read command. This process may be performed via the processor interface 450 included in the DMA controller 30. In addition, the processor core 20 may perform the operation using the data recorded in the register file, and record the operation result in the register file.

Next, the processor core 20 may transfer the data from the register file to the buffer included in the DMA controller 30 using a memory write command. This process may be performed via the processor interface 450 included in the DMA controller 30. In addition, the DMA controller 30 may transmit the data stored in the buffer to the external memory 70.

Therefore, a data transmission process between the DMA controller 30 and the scratch pad memory 40 may be omitted in the digital system 1. Accordingly, the latency and the power consumption to transmit data may be reduced. That is, the processor core 20 may directly access the buffers 431 through 434 via the processor interface 450, and thus, the latency and the power consumption to transmit data may be reduced. Hereinafter, three examples in which the processor core 20 accesses the buffers 431 through 434 are described.

For example, the processor core 20 may access the buffers 431 through 434 using a general memory 'read/write' command. In this example, the processor interface 450 is connected to the data memory system of the processor core 20 and has its own memory address region. Therefore, the processor core 20 may store the data that is recorded in the buffers 431 through 434 in the register file of the processor core 20 using a memory 'read' command with respect to the memory address region. Also, the processor core 20 may record the data that is stored in the register file of the processor core 20 in the buffers 431 through 434 using the memory 'write' command with respect to the address region.

As another example, the processor core 20 may use the buffers 431 through 434 as general register files such that the processor core 20 may access the buffers 431 through 434. In this example, the processor interface 450 may be connected to the processor core 20 via an independent connection, and the processor core 20 may provide the commands for accessing the buffers 431 through 434 via the processor interface 450. For example, the commands transmitted from the processor core 20 may designate at least one of the buffers 431 through 434 as an operand. Therefore the processor core 20 may directly access the buffers during the calculation performed by the processor core 20, and thus, data does not need to be transmitted through the register files of the processor core 20.

As another example, the processor core 20 may access the buffers 431 through 434 using a specific instruction. As described in the previous example, the processor interface 450 may be connected to the processor core 20 via the independent connection, and the processor core 20 may provide commands for accessing the buffers 431 through 434 via the processor interface 450. The processor core 20 may generate a specific instruction to transmit data between the buffers 431 through 434 and the register files of the processor core 20, or to control the buffers 431 through 434. An example of a specific instruction that may be generated by the processor core 20 is described below with reference to FIG. 8.

Figure 8:
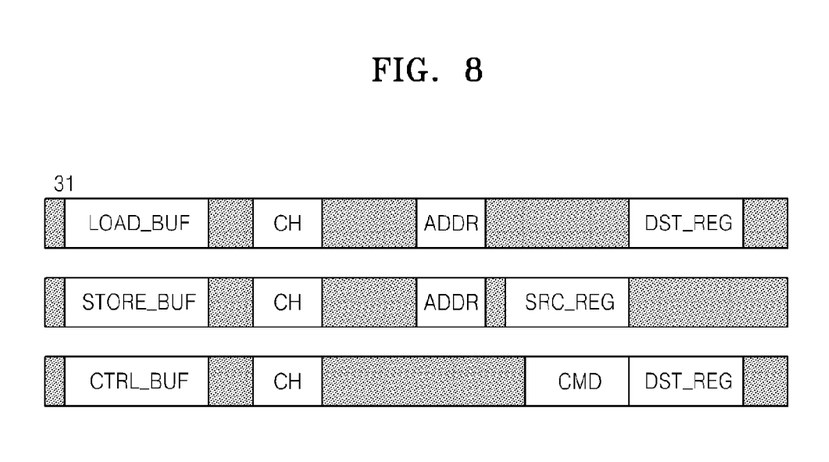
FIG. 8 is a diagram illustrating formatting a command language for accessing a buffer included in a DMA controller according to an exemplary embodiment.

FIG. 8 is a diagram illustrating an instruction format for accessing the buffers included in the DMA controller according to an exemplary embodiment.

Referring to FIG. 8, an example of encoding a specific instruction generated by the processor core 20 is shown. In particular, 'LOAD_BUF' is a command for reading values from the buffer and storing the values in the register file of the processor core 20, and 'STORE_BUF' is a command for reading a value from the register file of the processor core 20 and storing the value in the buffer. 'CH' refers to a field for designating at least one of the channels 421 through 423 of the DMA controller 30. Because the processor core 20 may not know which buffer will be allocated by the DMA controller 30, the processor core 20 may define the channel number instead of the buffer number. 'DST_REG' and 'SRC_REG' are fields respectively designating an entry of the register file that is to store a result of the command and an entry of the register file that is to be used as an input of the command.

As another example, the entry of the buffer may be set to be arbitrarily accessed, and not in the FIFO manner. Accordingly, the address of the entry that the processor core 20 is to access may be designated via the processor interface 450. A field 'ADDR' is used to designate the address of the entry.

Furthermore, 'CTRL_BUF' is a command for controlling or checking the buffer, and the command and the type thereof are determined by the 'CMD' field. For example, the command may be a command for receiving a buffer allocation, returning the buffer, setting the addressing mode, checking whether the buffer is filled, checking whether the buffer is empty, and the like.

Figure 6:
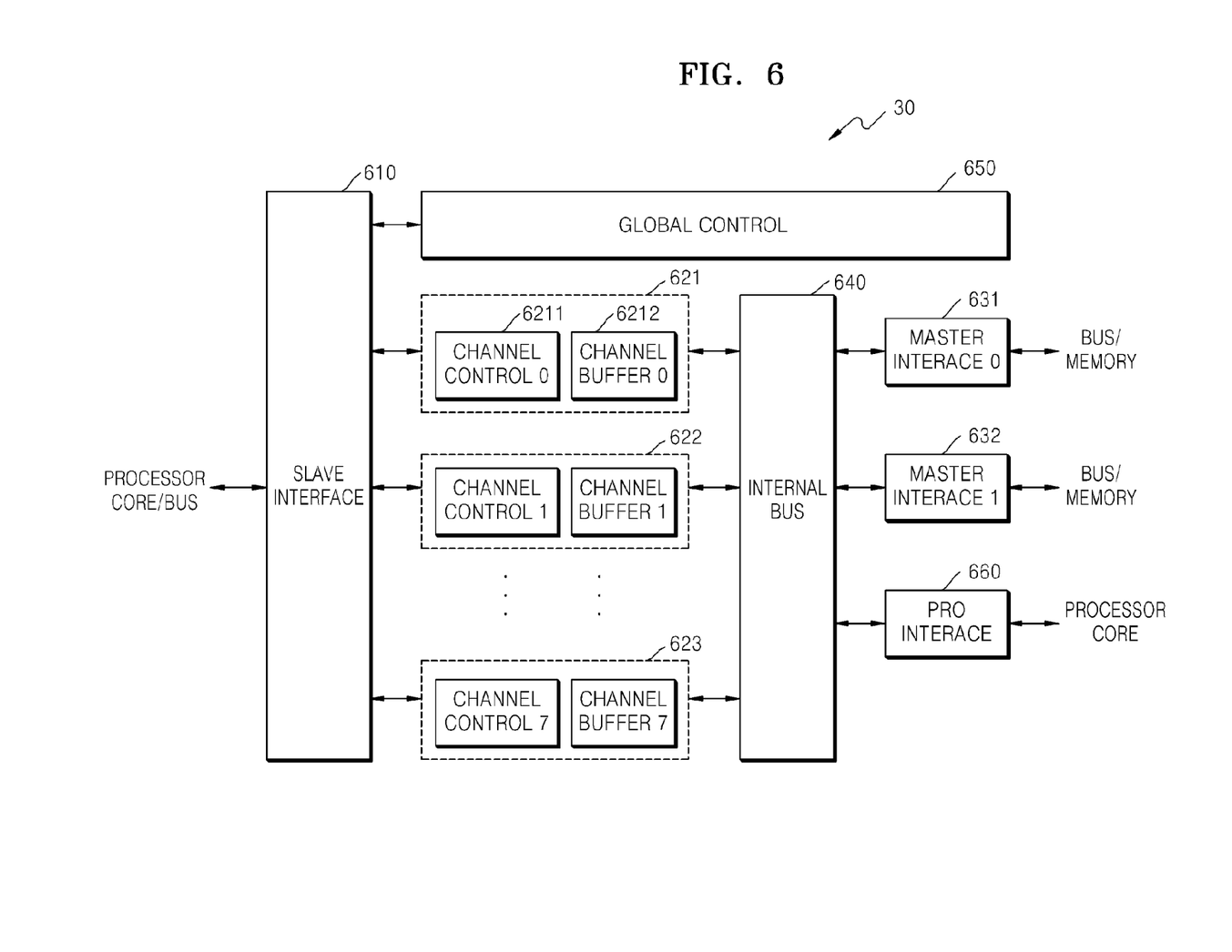
FIG. 6 is a block diagram of a DMA controller according to another exemplary embodiment.

FIG. 6 is a block diagram illustrating the DMA controller 30 according to another exemplary embodiment.

Referring to FIG. 6, the DMA controller 30 includes a slave interface 610, a plurality of channels 621 through 623, a plurality of master interfaces 631 and 632, an internal bus 640, a global controller 650, and a processor interface 660. Here, each channel, for example, channel 621 includes a channel controller 6211 and a buffer 6212.

The slave interface 610, the plurality of channels 621 through 623, the plurality of master interfaces 631 and 632, the internal bus 640, and the global controller 650 included in the DMA controller 30 shown in FIG. 6 have the same functions as those described with reference to FIGS. 2 and 3.

In contrast to the DMA controller 30 shown in FIG. 2, the DMA controller 30 of FIG. 6 includes a processor interface 660. Also, in contrast to the DMA controller 30 of FIG. 4, the DMA controller 30 of FIG. 4 is different from the DMA controller 30 of FIG. 6 in that, in FIG. 6, the buffer is connected to each of the channels. In other words, in this example the channels and the buffers do not connect with each other through an internal bus as they do in the example of FIG. 4 but instead are directly connected.

Because the DMA controller 30 of FIG. 6 includes the processor interface 660, the processor core 20 may directly access the buffers 621 through 623 included in the DMA controller 30. Therefore, the descriptions about the DMA controller 30 with reference to FIGS. 4 and 5 are applicable to the DMA controller 30 shown in FIG. 6.

Figure 7:
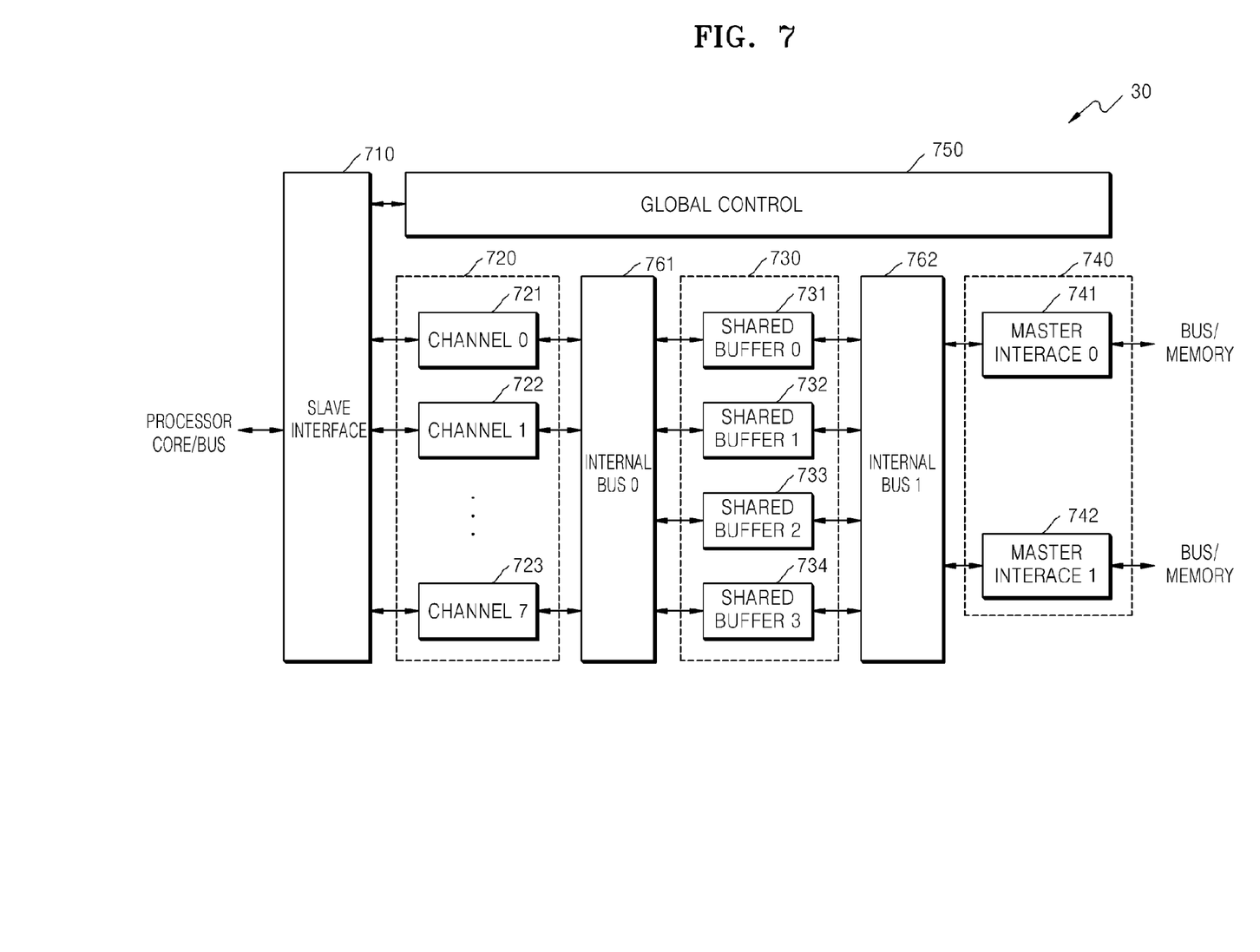
FIG. 7 is a block diagram of a DMA controller according to another exemplary embodiment.

FIG. 7 is a block diagram showing another example of the DMA controller 30 according to the embodiment of the present invention.

Referring to FIG. 7, the DMA controller 30 includes a slave interface 710, a channel group 720, a buffer group 730, a master interface group 740, a global controller 750, a first internal bus 761, and a second internal bus 762. Here, the channel group 720 includes a plurality of channels 721 through 723, and the buffer group 730 includes a plurality of buffers 731 through 734. Also, the master interface group 740 includes a plurality of master interfaces 741 and 742.

The slave interface 710, the channel group 720, the buffer group 730, the master interface group 740, the global controller 750, the first internal bus 761, and the second interface bus 762 in the DMA controller 30 of FIG. 7 have the same functions as those of FIGS. 4 and 5. Therefore, detailed descriptions about the above components are not provided here.

However, in comparison to the DMA controller 30 of FIG. 4, the slave interface 710 of the DMA controller 30 of FIG. 7 performs the functions of both of the slave interface 410 and the processor interface 450 of the DMA controller 30 of FIG. 4.

That is, the slave interface 710 is not divided among the slave interface 410 and the processor interface 450, but is physically the same interface. Therefore, descriptions about the DMA controller 30 with reference to FIGS. 4 and 5 are applicable to the DMA controller 30 shown in FIG. 7.

According to various aspects, the processor core may directly access the buffers in the DMA controller, and thus, data transmission process between the buffers in the DMA controller and the scratch pad memory may be omitted. Therefore, the latency and power consumption to transmit data between the processor system and the external memory may be reduced.

In addition, because the processor core may directly access the buffer while operating in a FIFO manner, the processor core does not need to calculate an entry address of the buffer. Therefore, performance of the processor system may be improved.

As another example, even when the buffer operates in the random access manner, the DMA controller may provide the processor core with an address generating pattern, and thus, the processor core does not need to calculate the entry address of the buffer. Therefore, the performance of the processor system may be improved.

The methods described above can be written as a computer program, a piece of code, an instruction, or some combination thereof, for independently or collectively instructing or configuring a processing device (e.g., processor or computer) to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

It should be understood that the exemplary embodiments described herein should be considered in a descriptive sense only and not for purposes of limitation. Descriptions of features or aspects within each embodiment should typically be considered as available for other similar features or aspects in other embodiments.

While the exemplary embodiments have been described with reference to the figures, it will be understood by those of ordinary skill in the art that various changes in form and details may be made therein without departing from the spirit and scope of the inventive concept as defined by the following claims.

What is claimed is:

1. A direct memory access (DMA) controller comprising:
a channel group comprising a plurality of DMA channels;
a buffer group comprising a plurality of buffers configured to store data;
a processor interface directly connecting a processor core to the buffer group and configured to:
receive information representing a first operation and including information for designating one of the plurality of DMA channels included in the channel group from the processor core;
corresponding to the first operation, transmit data which is stored in a buffer among the plurality of buffers included in the buffer group to the processor core; and
corresponding to the first operation, store data which is processed by the processor core in the buffer among the plurality of buffers included in the buffer group;
a slave interface configured to receive information representing a second operation sent by the processor core to the channel group, and allocate the second operation to at least one DMA channel from among the plurality of DMA channels included in the channel group; and
a master interface group connected to the buffer group, and comprising at least one master interface configured to transmit and receive data corresponding to the second operation to and from an external memory,
wherein the buffer is connected to the designated DMA channel,
wherein the at least one DMA channel is configured to operate in a mode from among a first mode in which data included in a first slave device is stored in the buffer and a second mode in which data stored in the buffer is transmitted to a second slave device,
wherein the first slave device and the second slave device are connected to the master interface group,
wherein at least two buffers from among the plurality of buffers are connected to each other and are configured to input and output the data as a double buffer,
wherein at least one buffer from among the at least two buffers connected to each other is configured to input and output the data in a first-in-first-out (FIFO) manner, and
wherein remaining buffers from among the at least two buffers connected to each other are configured to input and output the data in a random access manner.

2. The DMA controller of claim 1, wherein the processor interface and the slave interface are physically included in a same interface.

3. The DMA controller of claim 1, further comprising an internal bus connected to the buffer group, the master interface group, and the processor interface.

4. The DMA controller of claim 1, wherein the plurality of buffers included in the buffer group are configured to input and output data in a first-in-first-out (FIFO) manner.

5. The DMA controller of claim 1, wherein the plurality of buffers included in the buffer group are configured to input and output data in a random access manner based on addresses of entries.

6. The DMA controller of claim 5, wherein the random access manner comprises one of a first type in which the data is input and output to and from an entry included in the buffer based on an address of the entry generated according to a preset pattern, a second type in which the data is input and output to and from the entry based on an address of the entry generated according to an input stride, and a third type in which the data is input and output to and from the entry based on an address of the entry generated according to an order pattern defined in a pattern register.

7. A system comprising:
a direct memory access (DMA) controller; and
a processor core connected to the DMA controller,
wherein the DMA controller comprises:
a channel group comprising a plurality of DMA channels;
a buffer group comprising a plurality of buffers configured to store data;
a processor interface directly connecting the processor core to the buffer group and configured to:

receive information representing a first operation and including information for designating one of the plurality of DMA channels included in the channel group from the processor core;

corresponding to the first operation, transmit data which is stored in a buffer among the plurality of buffers included in the buffer group to the processor core; and corresponding to the first operation, store data which is processed by the processor core in the buffer among the plurality of buffers included in the buffer group; and a slave interface configured to receive information representing a second operation sent by the processor core to the channel group, and allocate the second operation to at least one DMA channel from among the plurality of DMA channels included in the channel group; and a master interface group connected to the buffer group, and comprising at least one master interface configured to transmit and receive data corresponding to the second operation to and from an external memory, wherein the buffer is connected to the designated DMA channel, wherein the at least one DMA channel is configured to operate in a mode from among a first mode in which data included in a first slave device is stored in the buffer and a second mode in which data stored in the buffer is transmitted to a second slave device, wherein the first slave device and the second slave device are connected to the master interface group, wherein at least two buffers from among the plurality of buffers are connected to each other and are configured to input and output the data as a double buffer, wherein at least one buffer from among the at least two buffers connected to each other is configured to input and output the data in a first-in-first-out (FIFO) manner, and wherein remaining buffers from among the at least two buffers connected to each other are configured to input and output the data in a random access manner.

8. The system of claim 7, wherein the processor interface and the slave interface are physically included in a same interface.

9. The system of claim 7, wherein the plurality of buffers included in the buffer group are configured to input and output data in a first-in-first-out (FIFO) manner or in a random access manner based on addresses of entries.

10. The system of claim 9, wherein the random access manner comprises one of a first type in which the data is input and output to and from an entry included in the buffer based on an address of the entry generated according to a preset pattern, a second type in which the data is input and output to and from the entry based on an address of the entry generated according to an input stride, and a third type in which the data is input and output to and from the entry based on an address of the entry generated according to an order pattern defined in a pattern register.

11. The system of claim 7, wherein, based on a signal transmitted from a DMA channel, each of the at least two buffers are configured to input and output the data in a first-in-first-out (FIFO) manner, or the at least two buffers are connected to each other as a multi-buffer.

* * * * *